United States Patent
Nakajo

(10) Patent No.: US 11,452,060 B2
(45) Date of Patent: Sep. 20, 2022

(54) PERMITTED COMMUNICATION PARTNER REGISTRATION METHOD

(71) Applicant: MURATA MACHINERY, LTD., Kyoto (JP)

(72) Inventor: Natsuko Nakajo, Kyoto (JP)

(73) Assignee: MURATA MACHINERY, LTD., Kyoto (JP)

(*) Notice: Subject to any disclaimer, the term of this patent is extended or adjusted under 35 U.S.C. 154(b) by 11 days.

(21) Appl. No.: 17/267,820

(22) PCT Filed: Jun. 4, 2019

(86) PCT No.: PCT/JP2019/022120
§ 371 (c)(1),
(2) Date: Feb. 11, 2021

(87) PCT Pub. No.: WO2020/039687
PCT Pub. Date: Feb. 27, 2020

(65) Prior Publication Data
US 2021/0168753 A1 Jun. 3, 2021

(30) Foreign Application Priority Data
Aug. 21, 2018 (JP) .............................. JP2018-154493

(51) Int. Cl.
*H04W 60/04* (2009.01)
*H04W 12/50* (2021.01)
(Continued)

(52) U.S. Cl.
CPC ............. *H04W 60/04* (2013.01); *B66C 13/40* (2013.01); *H04L 63/0876* (2013.01); *H04W 12/50* (2021.01)

(58) Field of Classification Search
CPC ........ H04Q 9/00; B65G 1/00; H04L 63/0876; H04L 63/08; H04L 63/101; B66F 9/07;
(Continued)

(56) References Cited

U.S. PATENT DOCUMENTS

2011/0238995 A1* 9/2011 Blanco ................ H04L 63/0853
708/250
2016/0295253 A1* 10/2016 Karnik ............. H04N 21/64322
(Continued)

FOREIGN PATENT DOCUMENTS

JP    2006-261807 A    9/2006
JP    2008-242755 A    10/2008
(Continued)

OTHER PUBLICATIONS

Official Communication issued in International Patent Application No. PCT/JP2019/022120, dated Aug. 20, 2019.

*Primary Examiner* — Oussama Roudani
(74) *Attorney, Agent, or Firm* — Keating & Bennett, LLP

(57) ABSTRACT

An operation-side communication device that is operated by an operator and a machine-side communication device that is connected to an industrial machine mutually register each other as partners permitted to communicate with each other. A communication device receives a partner ID of a partner communication device intended to be registered as a partner. The communication device wirelessly transmits a signal including the partner ID to the partner communication device. The partner communication device determines whether the partner ID included in the received signal corresponds to the ID of the partner communication device itself, and if so, the communication device registers the partner ID as the ID of a permitted communication partner. The above operations are repeated with the communication device and the partner communication device interchanged.

9 Claims, 10 Drawing Sheets

(51) Int. Cl.
*B66C 13/40* (2006.01)
*H04L 9/40* (2022.01)

(58) Field of Classification Search
CPC ... B66F 9/07581; H04W 12/06; H04W 12/71; H04W 12/08; H04W 60/04; H04W 12/50; B66C 13/40
See application file for complete search history.

(56) References Cited

U.S. PATENT DOCUMENTS

| | | |
|---|---|---|
| 2017/0085557 A1* | 3/2017 | Hu .................... H04L 9/0844 |
| 2017/0134884 A1* | 5/2017 | Taborn ................ H04W 76/14 |
| 2017/0310475 A1* | 10/2017 | Hu .................... H04L 63/0869 |
| 2018/0141751 A1 | 5/2018 | Muranaka |
| 2018/0241766 A1* | 8/2018 | Evesti ................ H04L 63/20 |
| 2019/0373469 A1* | 12/2019 | Bradley ............. H04W 12/0433 |

FOREIGN PATENT DOCUMENTS

| | | |
|---|---|---|
| JP | 2014-229362 A | 12/2014 |
| JP | 2018-039625 A | 3/2018 |
| WO | 2016/181734 A1 | 11/2016 |

\* cited by examiner

PERMITTED COMMUNICATION PARTNER REGISTRATION METHOD

BACKGROUND OF THE INVENTION

1. Field of the Invention

The present invention relates to a permitted communication partner registration method in a wireless communication.

2. Description of the Related Art

In a conventional device that performs wireless communication, devices that are permitted to communicate with each other preliminarily perform an operation of mutually authenticating each other and registering each other as partners. Since the devices are configured so as not to communicate with any other devices than the preliminarily registered partner, an unexpected operation can be prevented. Japanese Patent Application Laid-Open No. 2014-229362 disclose a wireless device pairing method.

In the wireless device pairing method according to Japanese Patent Application Laid-Open No. 2014-229362, a lighting device, after shifting to a pairing mode, generates authentication data that includes a rule of lighting with two or more colors and a device identifier, and wirelessly transmits the authentication data while lighting with two or more colors so as to be visible from the outside in accordance with the lighting rule. A pairing object terminal displays two or more pieces of authentication data that the pairing object terminal has received. An operator of the pairing object terminal confirms the lighting of the lighting device, and selects a piece of authentication data. The pairing object terminal stores a wireless communication address included in the selected piece of authentication data, and transmits a signal indicating the stored wireless communication address and a wireless communication address of the pairing object terminal itself. The lighting device receives the signal. If the wireless communication address included in the signal agrees with the wireless communication address of the lighting device itself, the lighting device stores, as its pairing object's address, the terminal's wireless communication address that has been received together with the wireless communication address of the lighting device itself.

If an operator mistakenly selects a piece of authentication data corresponding to a lighting device B different from a lighting device A that the operator is intending, the method according to Japanese Patent Application Laid-Open No. 2014-229362 causes a terminal to store a wireless communication address of the lighting device B and to transmit this address together with a wireless communication address of the terminal itself. The lighting device B stores the wireless communication address of the terminal from which the wireless communication address of the lighting device B itself has been received. As a result, pairing is performed between devices unexpected by the operator.

SUMMARY OF THE INVENTION

Preferred embodiments of the present invention provide permitted communication partner registration methods that are each able to avoid an erroneous registration of unintended communication devices as permitted communication partners.

The problem to be solved by the present invention is described above. The following describes solutions to the problem as well as advantageous effects thereof.

A preferred embodiment of the present invention provides a permitted communication partner registration method that enables an operation-side communication device that is operated by an operator and a machine-side communication device that is connected to an industrial machine to mutually register each other as candidates for partners that are permitted to communicate each other. The permitted communication partner registration method includes a machine-side communication device identification information reception step, a first test signal transmission step, a first identification information check step, a machine-side communication device identification information registration step, an operation-side communication device identification information reception step, a second test signal transmission step, a second identification information check step, and an operation-side communication device identification information registration step. In the machine-side communication device identification information reception step, machine-side communication device identification information that identifies the machine-side communication device is received by the operation-side communication device. In the first test signal transmission step, the operation-side communication device wirelessly transmits a first test signal to the machine-side communication device, the first test signal including the received machine-side communication device identification information. In the first identification information check step, the machine-side communication device determines whether or not the machine-side communication device identification information included in the received first test signal corresponds to identification information on the machine-side communication device itself. In the machine-side communication device identification information registration step, if the machine-side communication device determines that the machine-side communication device identification information included in the first test signal corresponds to the identification information on the machine-side communication device itself in the first identification information check step, the operation-side communication device registers the received machine-side communication device identification information as identification information on a candidate for a permitted communication partner. In the operation-side communication device identification information reception step, operation-side communication device identification information that identifies the operation-side communication device is received by the machine-side communication device. In the second test signal transmission step, the machine-side communication device wirelessly transmits a second test signal to the operation-side communication device, the second test signal including the received operation-side communication device identification information. In the second identification information check step, the operation-side communication device determines whether or not the operation-side communication device identification information included in the received second test signal corresponds to identification information on the operation-side communication device itself. In the operation-side communication device identification information registration step, if the operation-side communication device determines that the operation-side communication device identification information included in the second test signal corresponds to the identification information on the operation-side communication device itself in the second identification information check step, the machine-side communication device registers the received operation-side communication device identification information as identification information on a candidate for a permitted communication partner.

Each of the operation-side communication device and the machine-side communication device individually registers the identification information on the candidate for the permitted communication partner. In the course of each communication device registering the candidate for the permitted communication partner, the identification information on the candidate for the permitted communication partner intended to be registered is checked by a communication device defining and functioning as the candidate for the permitted communication partner. Accordingly, operations starting from each communication device are performed as follows: the communication device transmits identification information on a partner to the partner; the identification information is checked at the partner side; and a result of the check is confirmed by the communication device. These operations are able to increase the accuracy in registering the candidate for the permitted communication partner. Therefore, permitting communication between communication devices not intended by the operator is able to be prevented.

Preferably, for example, the permitted communication partner registration method is performed as follows. The permitted communication partner registration method includes a first announcement information output step, a first operation completion signal transmission step, a second announcement information output step, and a second operation completion signal transmission step. In the first announcement information output step, if the machine-side communication device determines that the received machine-side communication device identification information corresponds to the identification information on the machine-side communication device itself in the first identification information check step, a first announcement information is outputted to attract attention to the machine-side communication device itself. In the first operation completion signal transmission step, if a first operation corresponding to the first announcement information is performed, the machine-side communication device wirelessly transmits a first operation completion signal to the operation-side communication device, the first operation completion signal indicating completion of the first operation. In the second announcement information output step, if the operation-side communication device determines that the received operation-side communication device identification information corresponds to the identification information on the operation-side communication device itself in the second identification information check step, a second announcement information is outputted to attract attention to the operation-side communication device itself. In the second operation completion signal transmission step, if a second operation corresponding to the second announcement information is performed, the operation-side communication device wirelessly transmits a second operation completion signal to the machine-side communication device, the second operation completion signal indicating completion of the second operation. The machine-side communication device identification information registration step is performed after the operation-side communication device receives the first operation completion signal. The operation-side communication device identification information registration step is performed after the machine-side communication device receives the second operation completion signal.

Accordingly, the operator's operation is needed to confirm the communication device that is being registered as a permitted communication partner. This provides an opportunity for the operator to check whether or not the permitted communication partner is in line with the operator's intention. Therefore, an accurate registration is able to be provided.

Preferably, for example, the permitted communication partner registration method is performed as follows. The output of the first announcement information is implemented by lighting a lamp included in the machine-side communication device. The output of the second announcement information is implemented by lighting a lamp included in the operation-side communication device.

Accordingly, a simple implementation is provided in which the operator is able to visually confirm the communication device that is being registered as the permitted communication partner.

Preferably, for example, the permitted communication partner registration method is performed as follows. The permitted communication partner registration method includes a first determination result transmission step, a first announcement information output instruction transmission step, a second determination result transmission step, and a second announcement information output instruction transmission step. In the first determination result transmission step, the machine-side communication device transmits a first determination result to the operation-side communication device, the first determination result being a result of determination performed in the first identification information check step. In the first announcement information output instruction transmission step, if the first determination result received by the operation-side communication device indicates that the machine-side communication device identification information included in the first test signal corresponds to the identification information on the machine-side communication device itself, a first announcement information output instruction to control the first announcement information to be outputted is transmitted to the machine-side communication device. In the second determination result transmission step, the operation-side communication device transmits a second determination result to the machine-side communication device, the second determination result being a result of determination performed in the second identification information check step. In the second announcement information output instruction transmission step, if the second determination result received by the machine-side communication device indicates that the operation-side communication device identification information included in the second test signal corresponds to the identification information on the operation-side communication device itself, a second announcement information output instruction to control the second announcement information to be outputted is transmitted to the operation-side communication device.

Accordingly, by checking the announcement information, the operator is able to recognize whether or not the result of checking the identification information is normal.

Preferably, for example, the permitted communication partner registration method is implemented in a system including a plurality of the operation-side communication devices, a plurality of the industrial machines, and a plurality of the machine-side communication devices each connected to each of the industrial machines in one-to-one correspondence.

Accordingly, a permitted communication partner intended by the operator is able to be accurately registered, even in a complicated system having a plurality of the operation-side communication devices and a plurality of the machine-side communication devices.

Preferably, for example, the permitted communication partner registration method is performed as follows. In the machine-side communication device identification information reception step, the machine-side communication device identification information is received by the operation-side communication device via a wired cable. In the operation-side communication device identification information reception step, the operation-side communication device identification information is received by the machine-side communication device via a wired cable.

Since the wired cables are provided, the identification information is able to be exchanged between the communication devices while providing the operator a realistic awareness of the partner communication device that the communication device is about to permit to communicate therewith.

Preferably, for example, the permitted communication partner registration method is performed as follows. The operation-side communication device is a remote controller that is connectable to a portable terminal via a wired cable, the portable terminal being able to perform wireless communication. The portable terminal wirelessly transmits an instruction to control an operation of the industrial machine.

Accordingly, the portable terminal and the operation-side communication device are able to cooperate to control the operation of the industrial machine.

Preferably, for example, the permitted communication partner registration method is performed as follows. The portable terminal receives the machine-side communication device identification information on the machine-side communication device from the machine-side communication device via a wired cable, and outputs the received machine-side communication device identification information to the operation-side communication device via a wired cable. The portable terminal receives the operation-side communication device identification information on the operation-side communication device from the operation-side communication device via a wired cable, and outputs the received operation-side communication device identification information to the machine-side communication device via a wired cable.

Accordingly, via the portable terminal, the operation-side communication device and the machine-side communication device are able to exchange the identification information accurately and easily. In addition, the inclusion of the wired cables allows the operator to register the permitted communication partners while the operator has a realistic awareness about the correspondence between the two communication devices.

Preferably, for example, the permitted communication partner registration method is performed as follows. The machine-side communication device identification information registration step is performed while the operation-side communication device is in a maintenance mode different from a normal mode performed when the industrial machine is operated. The operation-side communication device identification information registration step is performed while the machine-side communication device is in a maintenance mode different from a normal mode performed when the industrial machine is operated.

Accordingly, the permitted communication partners are able to be registered while the industrial machine is not operated.

Another preferred embodiment of the present invention provides a wireless communication system as follows. The wireless communication system includes an operation-side communication device that is operated by an operator and a machine-side communication device that is connected to an industrial machine. To mutually register the operation-side communication device and the machine-side communication device as candidates for partners that are permitted to communicate each other, the operation-side communication device receives machine-side communication device identification information that identifies the machine-side communication device, and then wirelessly transmits a first test signal to the machine-side communication device, the first test signal including the received machine-side communication device identification information. The machine-side communication device determines whether or not the machine-side communication device identification information included in the received first test signal corresponds to identification information on the machine-side communication device itself. If the machine-side communication device determines that the machine-side communication device identification information included in the first test signal corresponds to the identification information on the machine-side communication device itself, the operation-side communication device registers the received machine-side communication device identification information as identification information on a candidate for a permitted communication partner. The machine-side communication device receives operation-side communication device identification information that identifies the operation-side communication device, and then wirelessly transmits a second test signal to the operation-side communication device, the second test signal including the received operation-side communication device identification information. The operation-side communication device determines whether or not the operation-side communication device identification information included in the received second test signal corresponds to identification information on the operation-side communication device itself. If the operation-side communication device determines that the operation-side communication device identification information included in the second test signal corresponds to the identification information on the operation-side communication device itself, the machine-side communication device registers the received operation-side communication device identification information as identification information on a candidate for a permitted communication partner.

In the wireless communication system, each of the operation-side communication device and the machine-side communication device individually registers the identification information on the candidate for the permitted communication partner. In the course of each communication device registering the candidate for the permitted communication partner, the identification information on the candidate for the permitted communication partner intended to be registered is checked by a communication device defining and functioning as the candidate for the permitted communication partner. Accordingly, operations starting from each communication device are performed as follows: the communication device transmits identification information on a partner to the partner; the identification information is checked at the partner side; and a result of the check is confirmed by the communication device. These operations are able to increase the accuracy in registering the candidate for the permitted communication partner. Therefore, permitting communication between communication devices not intended by the operator is able to be prevented.

The above and other elements, features, steps, characteristics and advantages of the present invention will become

DETAILED DESCRIPTION OF THE PREFERRED EMBODIMENTS

Figure 1:
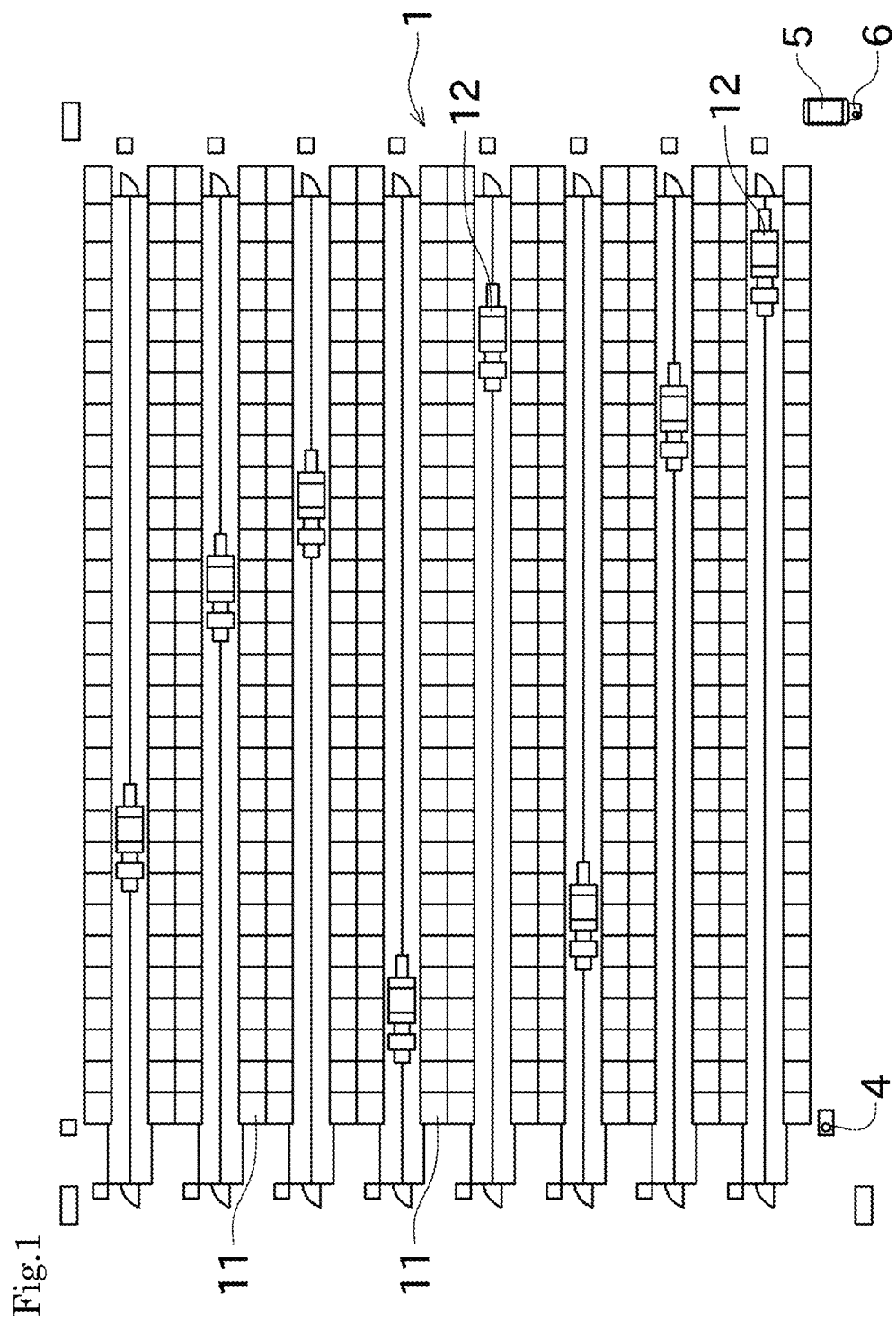
FIG. 1 is a plan view showing an automated warehouse in which wireless communication is performed by a permitted communication partner registration method according to a preferred embodiment of the present invention.
Figure 2:
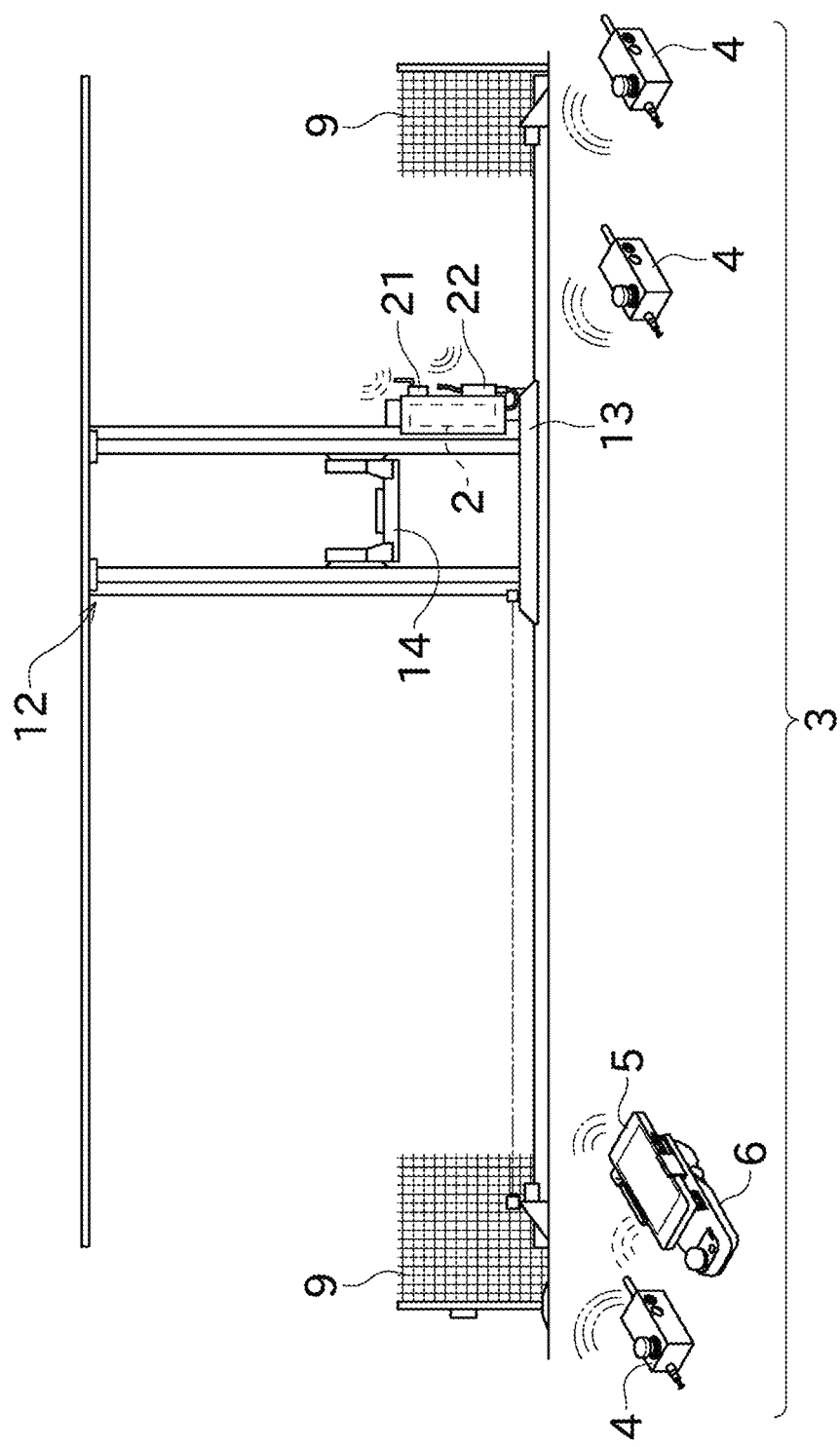
FIG. 2 is a diagram illustrating one of stacker cranes included in the automated warehouse.
Figure 3:
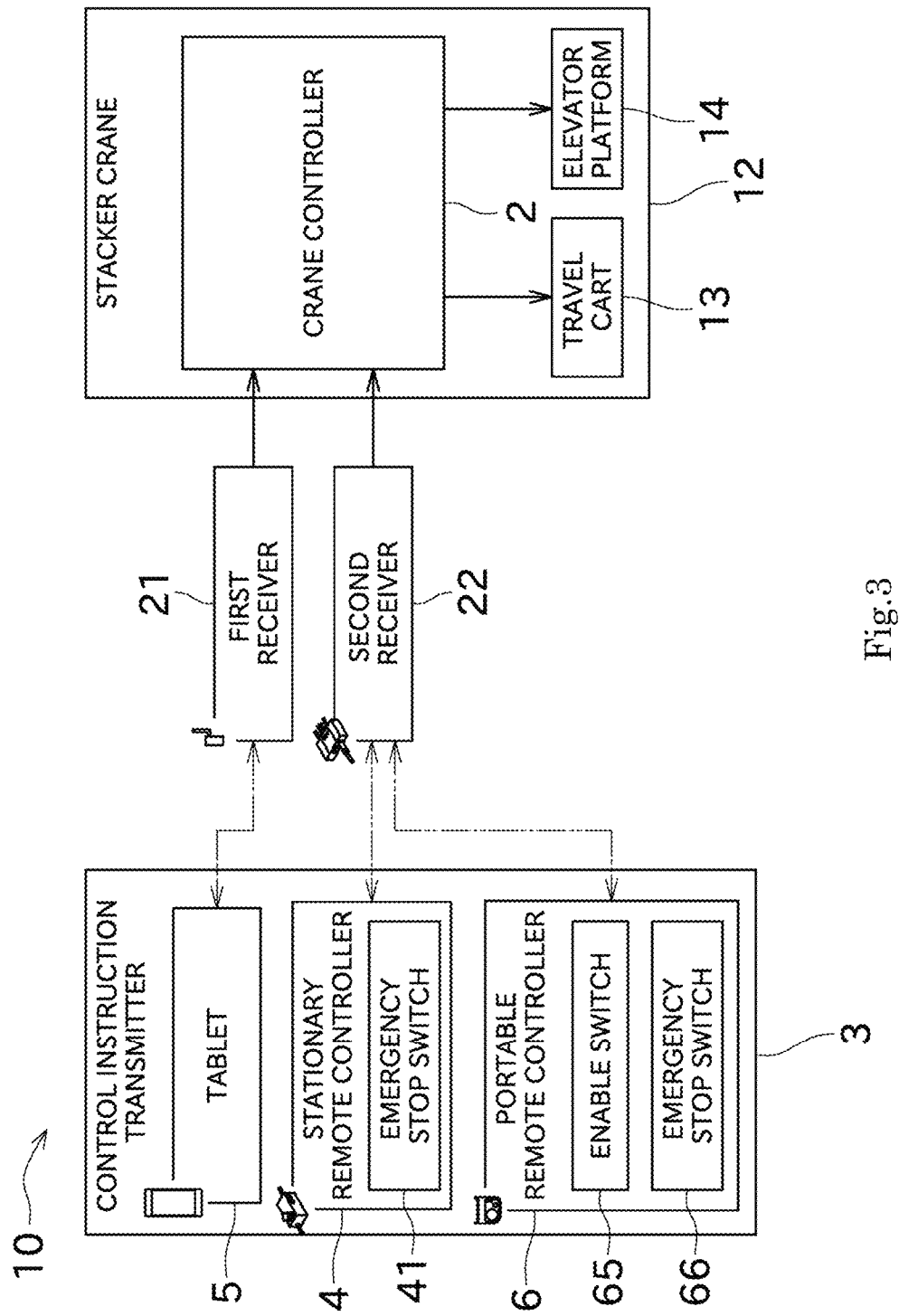
FIG. 3 is a block diagram showing a control system of the stacker crane.
Figure 4:
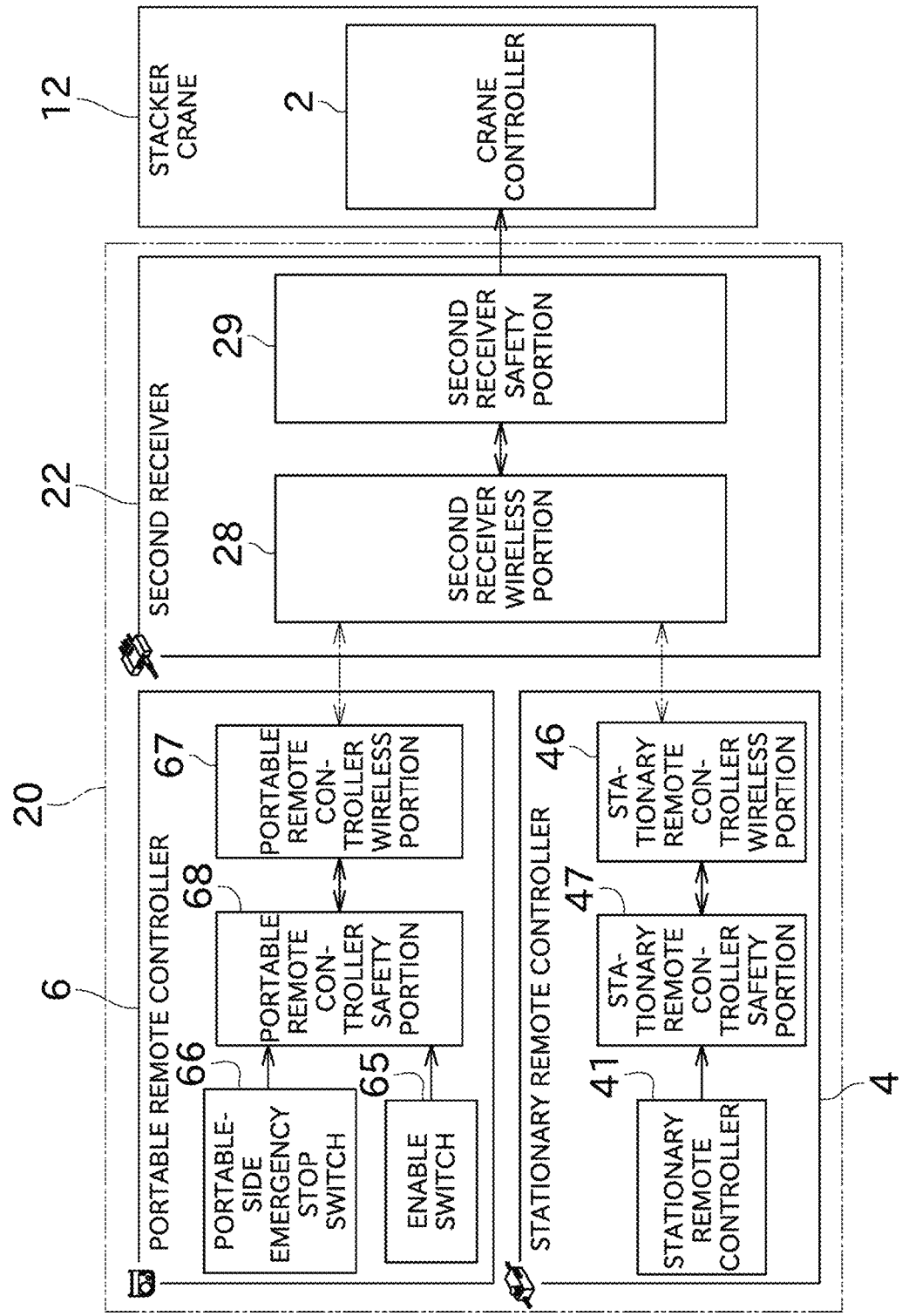
FIG. 4 is a block diagram showing a safety signal system.

Hereinafter, preferred embodiments of the present invention will be described with reference to the drawings. FIG. 1 is a plan view showing an automated warehouse 1 in which wireless communication is performed by a permitted communication partner registration method according to a preferred embodiment of the present invention. FIG. 2 is a diagram illustrating one of stacker cranes 12 included in the automated warehouse 1. FIG. 3 is a block diagram showing a control system 10 of the stacker crane 12. FIG. 4 is a block diagram showing a safety signal system 20.

The automated warehouse 1 shown in FIG. 1 includes a plurality of stacker racks 11 and a plurality of stacker cranes (industrial machines) 12. The stacker racks 11 have many storage spaces that are able to store goods, for example, portions and materials. The stacker cranes 12 automatically load/unload goods into/from the storage spaces of the stacker racks 11. Through the stacker cranes 12, the automated warehouse 1 is able to automatically store goods into the stacker racks 11, and is able to automatically unload goods stored in the stacker racks 11.

As shown in FIG. 2, each of the stacker cranes 12 includes: a travel cart 13 that travels along a track; an elevator platform 14 that is able to ascend and descend vertically; and a crane controller (machine controller) 2 that controls operations of the travel cart 13 and the elevator platform 14.

In operating the stacker crane 12, its operation mode is able to be selected from an automatic operation mode and a manual operation mode. In the automatic operation mode, the stacker crane 12 automatically operates in accordance with a pre-programmed rule. In the manual operation mode, the stacker crane 12 operates in accordance with an operation instruction provided by an operator.

The crane controller 2 shown in FIG. 2 and FIG. 3 includes known controllers, for example, a CPU, a ROM, a RAM, and an input/output unit. The ROM stores various programs, data (rules) relating to an automatic operation, and the like. The CPU is able to read out the various programs, etc. from the ROM, and execute them.

When the automatic operation mode is selected as the operation mode of the stacker crane 12, the crane controller 2 controls operations of the travel cart 13 and the elevator platform 14 based on the stored data relating to the automatic operation, and the like.

When the manual operation mode is selected as the operation mode of the stacker crane 12, the crane controller 2 controls operations of the travel cart 13 and the elevator platform 14 in accordance with an operation instruction provided from the operator and a state signal of each switch. The operation instruction is received via a first receiver 21. The state signal is received via a second receiver 22.

In the automated warehouse 1, an area including an operation area of the stacker crane 12 is partitioned by a fence 9 or the like, as shown in FIG. 2, to prevent goods from being touched, for example. The partitioned area is defined as a restricted area. In order to detect the operator entering the operation area to perform maintenance work or the like, a sensor is provided at a door in the fence 9, for example. The door and sensor are not shown in FIG. 2. If the sensor detects the door being opened while the stacker crane 12 is operating in the automatic operation mode, the operation of the stacker crane 12 automatically stops.

The automated warehouse 1 includes the first receiver 21 and the second receiver (machine-side communication device) 22. The first receiver 21 and the second receiver 22, each of which is implemented as a communication device, are installed near the crane controller 2 of the stacker crane 12. The first receiver 21 and the second receiver 22 are electrically connected to the crane controller 2. One stacker crane 12 is provided with one first receiver 21 and one second receiver 22.

The first receiver 21 wirelessly communicates with a tablet 5, which will be described later, via a wireless LAN. The wireless LAN has a plurality of wireless communication channels, and uses a radio wave, an infrared ray, or the like to transmit data. In this preferred embodiment, Wi-Fi (registered trademark) is implemented as the wireless LAN. This wireless communication allows the first receiver 21 to receive an operation instruction that is inputted to the tablet 5 by the operator operating the tablet 5. Examples of the operation instruction include an instruction to control the travel cart 13 to travel, an instruction to ascend or descend the elevator platform 14, and the like. The first receiver 21 outputs a signal indicating the operation instruction to the crane controller 2, the signal defining and functioning as a control signal to control operations of the stacker crane 12.

The second receiver 22 wirelessly communicates with a stationary remote controller 4 and a portable remote controller 6, which will be described later, via a wireless LAN. In this preferred embodiment, Wi-Fi (registered trademark) is implemented as the wireless LAN. This wireless communication allows the second receiver 22 to receive various state signals. Examples of the state signal include a state signal indicating a state of an emergency stop switch, a state signal indicating a state of an enable switch that enables an operation instruction provided from the tablet 5, and the like. The second receiver 22 outputs the received state signal to the crane controller 2, the received state signal defining and functioning as a control signal to control operations of the stacker crane 12. The first receiver 21 and the second receiver 22 operate on different frequency bands or different channels for communication.

Figure 5:
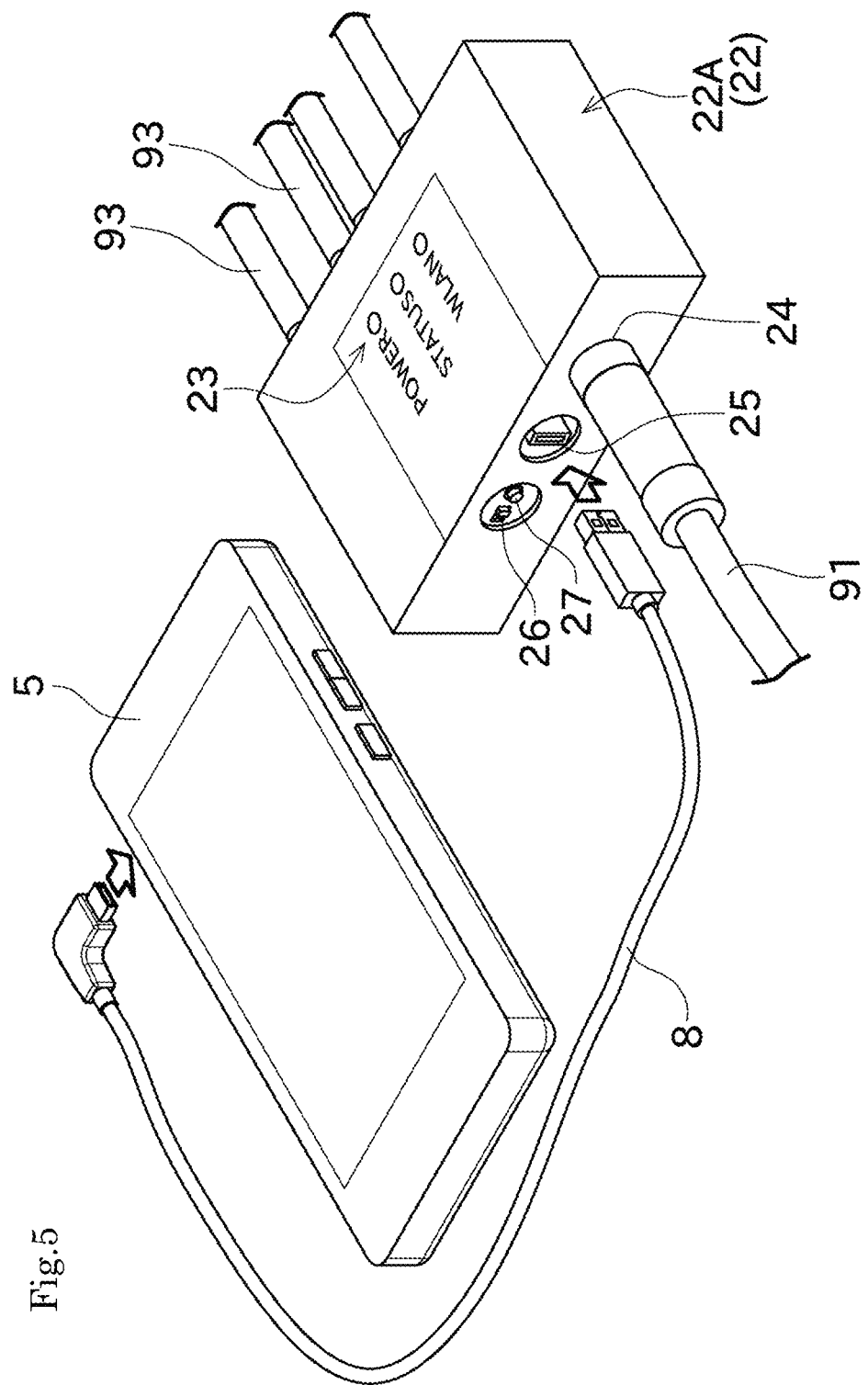
FIG. 5 is a perspective view showing a second receiver.

Next, the second receiver 22 will be detailed with reference to FIG. 5. FIG. 5 is a perspective view showing the second receiver 22.

As shown in FIG. 5, the second receiver 22 includes a second receiver state display portion 23, a second receiver power connector 24, a second receiver USB connector 25, a second receiver maintenance switch 26, and a confirm button 27.

The second receiver state display portion 23 includes three lamps, namely, a power indicator lamp, a status lamp, and a WLAN lamp. Each of the lamps is an LED. The second receiver state display portion 23 indicates various operation states of the second receiver 22 by combinations of lighting colors and lighting states (lighting or blinking) of the LEDs.

A power cable 91 is connected to the second receiver power connector 24. Through the power cable 91, electric power for operations of the second receiver 22 is supplied. The power cable 91 includes a plurality of electric wires. The power cable 91 not only supplies electric power, but the power cable 91 also defines and functions as a signal cable to input and output signals. In the second receiver 22 of this preferred embodiment, a power switch is omitted. Powering on/off the second receiver 22 is implemented by attachment/detachment of the power cable 91 to/from the second receiver power connector 24. It however may be acceptable that the second receiver 22 has a power switch.

The second receiver 22 has a connector (not shown) for electrical connection of an antenna cable 93, in addition to the second receiver power connector 24. A wireless antenna (not shown) for transmission and reception of radio waves is connected to the antenna cable 93.

The second receiver USB connector 25 is included to connect a USB cable (wired cable) 8. Through the USB cable 8, the second receiver 22 is able to be connected by wire to the tablet 5 which will be described later. The USB cable 8 defines and functions as a data communication cable. The operator is able to confirm a state of the second receiver 22 via the tablet 5 connected to the second receiver 22. The operator is also able to provide various instructions to the second receiver 22 by operating the tablet 5.

The second receiver maintenance switch 26 may be a slide switch, for example. Sliding the second receiver maintenance switch 26 allows the second receiver 22 to be switched between two operation modes, namely, a normal mode and a maintenance mode. The normal mode of the second receiver 22 is an operation mode performed in manually or automatically operating the stacker crane 12, and the maintenance mode thereof is an operation mode performed in performing an initial setting and various settings.

Changing the operation mode by the second receiver maintenance switch 26 is enabled by once powering off the second receiver 22 and then powering on the second receiver 22 again.

As shown in FIG. 4, the second receiver 22 includes a second receiver wireless portion 28 and a second receiver safety portion 29. The second receiver wireless portion 28 and the second receiver safety portion 29, which are connected by a UART (Universal Asynchronous Receiver/Transmitter), for example, perform serial communication.

The second receiver wireless portion 28, which is a computer (specifically, a wireless communication module), includes a CPU, a ROM, a RAM, and the like. The second receiver wireless portion 28 wirelessly communicates with the stationary remote controller 4 and with the portable remote controller 6.

The second receiver safety portion 29, which is a computer, includes a CPU, a ROM, a RAM, and the like. The second receiver safety portion 29 provides a function safety portion. To be specific, the second receiver safety portion 29 determines whether or not to shift to a safe state where the stacker crane 12 does not operates, based on a result of communication between the second receiver wireless portion 28 and the stationary remote controller 4 and between the second receiver wireless portion 28 and the portable remote controller 6. Then, the second receiver safety portion 29 may output a safe state request signal to the crane controller 2.

As shown in FIG. 3, the automated warehouse 1 of this preferred embodiment is provided with a control instruction transmitter 3 that enables the operator to provide instructions to the stacker crane 12. The control instruction transmitter 3 is able to perform wireless communication with the crane controller 2 via a wireless LAN for example, through the first receiver 21 and the second receiver 22. Upon the operator operating the control instruction transmitter 3, the control instruction transmitter 3 transmits an instruction in accordance with the operation, to the crane controller 2 through the first receiver 21 and the second receiver 22.

Figure 6:
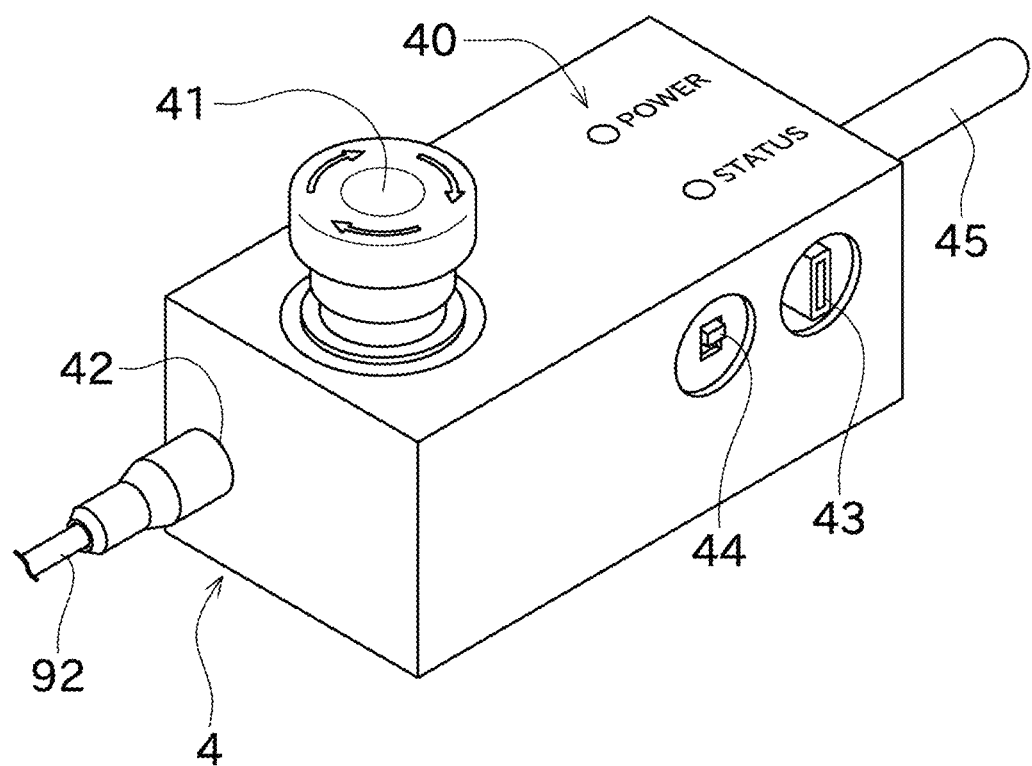
FIG. 6 is a perspective view showing a stationary remote controller.
Figure 7:
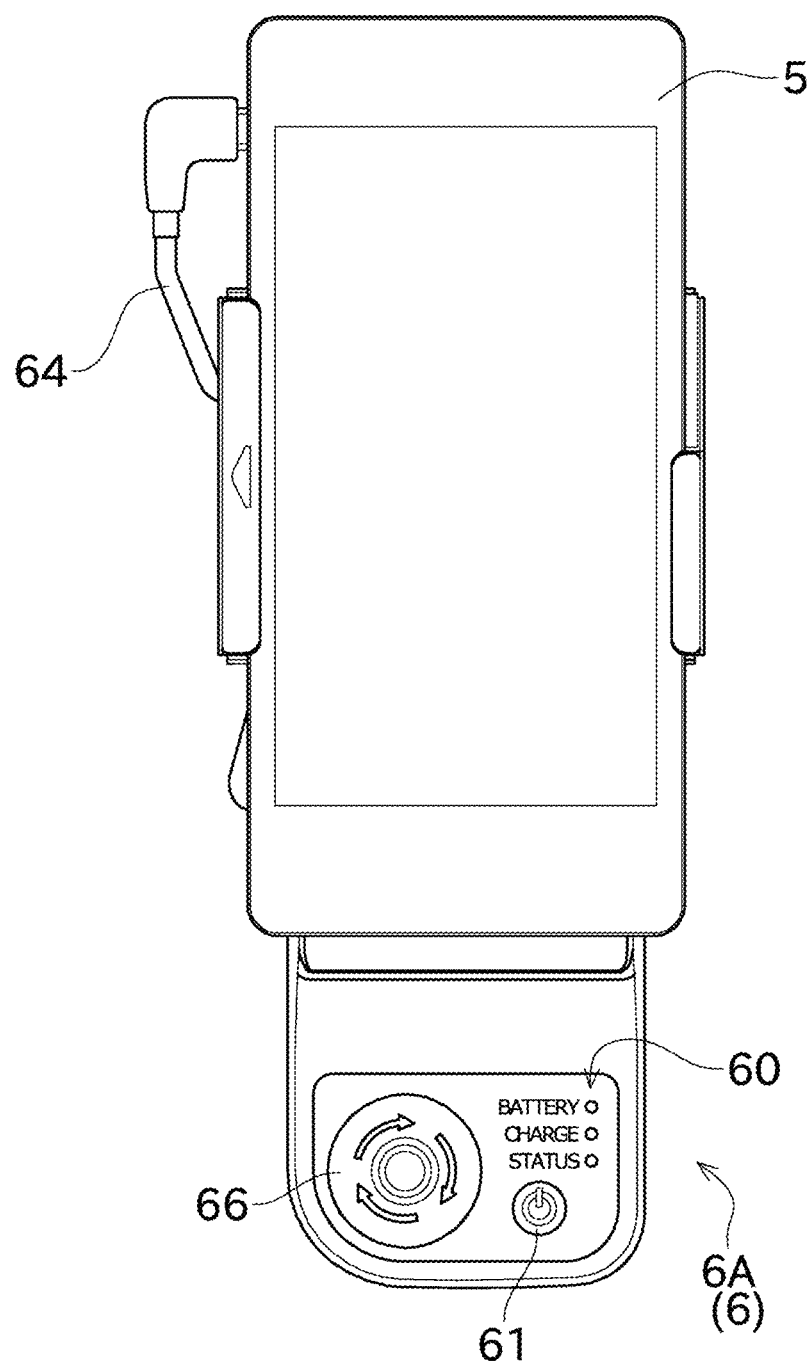
FIG. 7 is a front view showing a state where a tablet is mounted to a portable remote controller.
Figure 8:
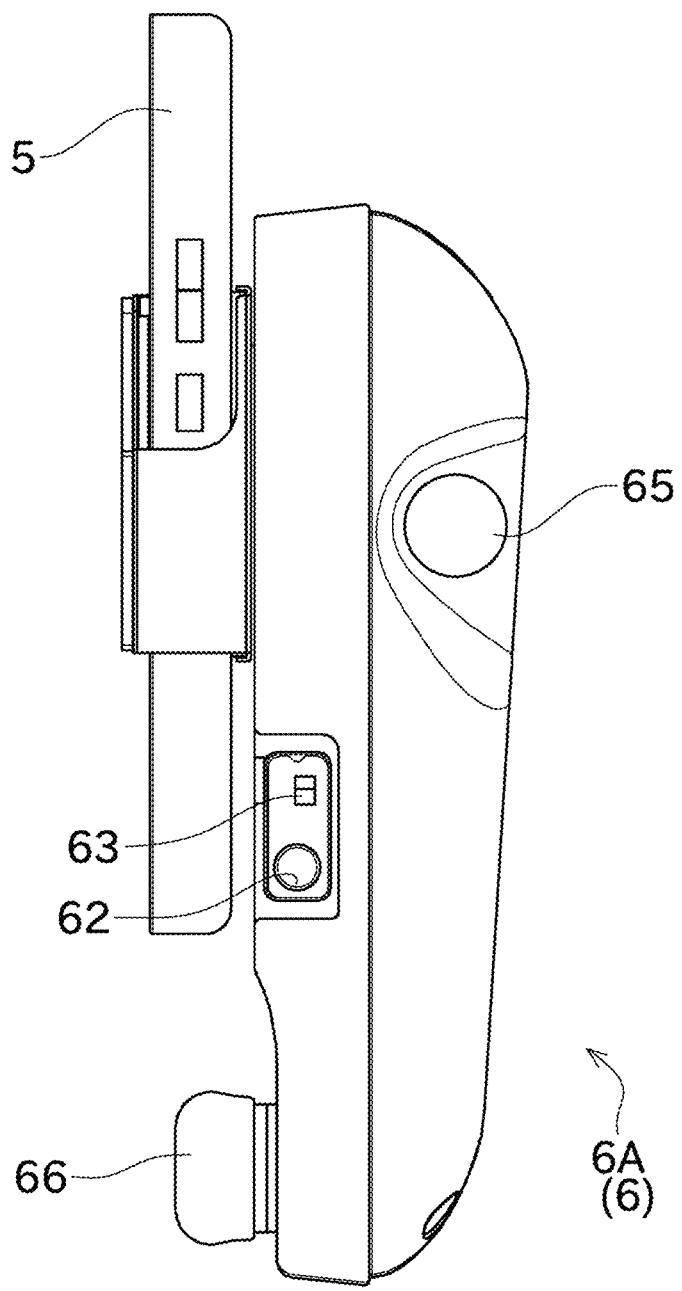
FIG. 8 is a side view showing the state where the tablet is mounted to the portable remote controller.

The control instruction transmitter 3 includes the stationary remote controller 4 shown in FIG. 6, the tablet (portable terminal) 5 shown in FIG. 7 and FIG. 8, and the portable remote controller (operation-side communication device) 6 shown in

FIG. 7 and FIG. 8.

The stationary remote controller 4 will be detailed with reference to FIG. 6. FIG. 6 is a perspective view showing the stationary remote controller 4.

The stationary remote controller 4 is fixed at the outside of the fence 9, for example, and the operator is able to operate the stationary remote controller 4 at a location outside the operation area of the automated warehouse 1. The stationary remote controller 4 is operated when the operation of the stacker crane 12 needs to be stopped promptly in a case of emergency.

As shown in FIG. 6, the stationary remote controller 4 includes a stationary remote controller state display portion 40, a stationary-side emergency stop switch 41, a stationary remote controller power connector 42, a stationary remote controller USB connector 43, a stationary remote controller maintenance switch 44, and a wireless antenna 45.

As shown in FIG. 6, the stationary remote controller state display portion 40 includes two lamps, namely, a power indicator lamp and a status lamp. Each of the lamps is an LED. The stationary remote controller state display portion 40 indicates various operation states of the stationary remote controller 4 by combinations of lighting colors and lighting states (lighting or blinking) of the LEDs.

The stationary-side emergency stop switch 41 may be a push button switch. The stationary-side emergency stop switch 41 is located on a front surface of the stationary remote controller 4. The stationary-side emergency stop switch 41 is pressed when the stacker crane 12 needs to be stopped emergently. Once the stationary-side emergency stop switch 41 is pressed, the stationary-side emergency stop switch 41 is kept in the pressed state even after the operating force is removed therefrom. Rotating or pulling the stationary-side emergency stop switch 41 to the right releases the pressed state.

In a state where the stationary-side emergency stop switch 41 is pressed, the stationary remote controller 4 transmits, to the second receiver 22, an emergency stop signal that is a state signal indicating the emergency stop switch being on.

In a state where the stationary-side emergency stop switch 41 is not pressed, the stationary remote controller 4 transmits, to the second receiver 22, a non-stop signal that is a state signal indicating the emergency stop switch being off.

A power cable 92 is connected to the stationary remote controller power connector 42. Through the power cable 92 connected to the stationary remote controller power connector 42, electric power for operations of the stationary remote controller is supplied. In the stationary remote controller 4 of this preferred embodiment, disconnecting the power cable 92 from an external power source or disconnecting the power cable 92 from the stationary remote controller power connector 42 powers off the stationary remote controller 4. This however is not limitative. It may also be acceptable that the stationary remote controller 4 has a power switch that enables switching power-on/power-off.

The stationary remote controller USB connector 43 connects the USB cable 8. Through the USB cable 8, the stationary remote controller 4 is able to be connected by wire to the tablet 5. The operator is able to confirm a state of the stationary remote controller 4 via the tablet 5 connected to the stationary remote controller 4. The operator is also able to provide various instructions to the stationary remote controller 4 by operating the tablet 5.

The stationary remote controller maintenance switch 44 may be a slide switch, for example. Sliding the stationary remote controller maintenance switch 44 allows the stationary remote controller 4 to be switched between a normal mode and a maintenance mode. The normal mode of the stationary remote controller 4 is an operation mode in which the stacker crane 12 is able to be stopped emergently, and the maintenance mode thereof is an operation mode performed in performing an initial setting and various settings. Changing the operation mode by the stationary remote controller maintenance switch 44 is enabled by once powering off the stationary remote controller 4 and then powering on the stationary remote controller 4 again.

The wireless antenna 45, which is a rod-shaped antenna, is able to perform transmission and reception of radio waves.

As shown in FIG. 4, the stationary remote controller 4 has a stationary remote controller wireless portion 46 and a stationary remote controller safety portion 47. The stationary remote controller wireless portion 46 and the stationary remote controller safety portion 47, which are connected by a UART for example, perform serial communication.

The stationary remote controller wireless portion 46, which is a computer (specifically, a wireless communication module), includes a CPU, a ROM, a RAM, and the like. The stationary remote controller wireless portion 46 wirelessly communicates with the second receiver wireless portion 28 included in the second receiver 22.

The stationary remote controller safety portion 47, which is a computer, includes a CPU, a ROM, a RAM, and the like. The stationary remote controller safety portion 47 provides a function safety portion. The stationary remote controller safety portion 47 is electrically connected to the stationary-side emergency stop switch 41. The stationary remote controller safety portion 47 outputs a state signal indicating a state of the stationary-side emergency stop switch 41 to the stationary remote controller wireless portion 46.

Referring to FIG. 7 and FIG. 8, the tablet 5 and the portable remote controller 6 will be described. FIG. 7 is a front view showing a state where the tablet 5 is mounted to the portable remote controller 6. FIG. 8 is a side view showing the state where the tablet 5 is mounted to the portable remote controller 6.

The tablet 5 is a known tablet-shaped computer including a CPU, a ROM, a RAM, an input/output unit, and the like. The tablet 5 has a touch panel display that integrates an operating portion and a display portion. The operating portion is operated by the operator. The display portion displays various types of information.

The tablet 5, which has a built-in wireless antenna (not shown), is able to perform wireless communication with the first receiver 21 as shown in FIG. 3. In accordance with an operation performed by the operator, the tablet 5 wirelessly transmits, to the first receiver 21, various types of instruction, for example, an instruction to switch the operation mode of the stacker crane 12 and an operation instruction to move the stacker crane 12 while the stacker crane 12 is in the manual operation mode.

The tablet 5 is able to be connected by wire to each of the stationary remote controller 4, the portable remote controller 6, and the second receiver 22 via a USB cable (for example, the USB cable 8 shown in FIG. 5). The tablet 5 is able to display various types of information on a communication device to which the tablet 5 is connected, and also able to output a control instruction to operate the communication device to the communication device. That is, by being connected to each communication device, the tablet 5 defines and functions as a man-machine interface for the communication device.

The portable remote controller 6 is provided in combination with the tablet 5, to control operations of the stacker crane 12 while the stacker crane 12 is in the manual operation mode. The portable remote controller 6, which has a built-in wireless antenna (not shown), is able to perform wireless communication with the second receiver 22 as shown in FIG. 3, etc.

Referring to FIG. 7 and FIG. 8, the portable remote controller 6 includes a portable remote controller state display portion 60, a power button 61, a remote controller power connector 62, a remote controller maintenance switch 63, a USB cable (wired cable) 64, an enable switch 65, and a portable-side emergency stop switch 66.

As shown in FIG. 7, the portable remote controller state display portion 60 includes three lamps, namely, a power indicator lamp, a charge lamp, and a status lamp. Each of the lamps is an LED. The portable remote controller state display portion 60 indicates various operation states of the portable remote controller 6 by combinations of lighting colors and lighting states (lighting or blinking) of the LEDs.

The power button 61 is a push button switch. Pressing the power button 61 is able to switch the presence or absence of electric power supply from a rechargeable battery (not shown) included in the portable remote controller 6. Accordingly, powering on/off the portable remote controller 6 is implemented.

A cable (not shown) to charge the rechargeable battery described above is able to be connected to the remote controller power connector 62.

The remote controller maintenance switch 63 may be a slide switch, for example. Sliding the remote controller maintenance switch 63 allows the portable remote controller 6 to be switched between two operation modes, namely, a normal mode and a maintenance mode. The normal mode of the portable remote controller 6 is an operation mode to operate the stacker crane 12 while the stacker crane 12 is in the manual operation mode. The maintenance mode thereof is an operation mode performed in performing an initial setting and various settings. Changing the operation mode via the remote controller maintenance switch 63 is enabled by once powering off the portable remote controller 6 and then powering on the portable remote controller 6 again.

The USB cable 64 is drawn out of a housing of the portable remote controller 6. The USB cable 64, which is a data communication cable, is able to be connected to the tablet 5.

The enable switch 65 may be a push button switch, for example. The enable switch 65 is located at a side surface of the portable remote controller 6, and the operator is able to press the enable switch 65 while holding the portable remote controller 6 with one of his/her hands. While the stacker crane 12 is in the manual operation mode, the enable switch 65 is pressed with a certain degree of operating force, in order to indicate that the operation of the stacker crane 12 is permitted. Even after being pressed, the enable switch 65 returns from the pressed state to its original state if the operating force is removed. Accordingly, in a case of the operator falling into an unexpected situation, for example, tumbling, the operation of the stacker crane 12 is able to be immediately set as unpermitted.

In a state where the enable switch 65 is pressed, the portable remote controller 6 transmits, to the second receiver 22, an enable signal that is a state signal indicating the enable switch being on. In a state where the enable switch 65 is not pressed, the portable remote controller 6 transmits, to the second receiver 22, a disable signal that is a state signal indicating the enable switch being off.

In this preferred embodiment, the enable switch 65 is a 3-position type switch. In a case where the operator presses the enable switch 65 with a strong force as well as a case where the enable switch 65 is not pressed, the portable remote controller 6 transmits the disable signal to the second receiver 22. This allows the operation of the stacker crane 12 to be stopped appropriately in a case of emergency, even though the operator keeps touching the enable switch 65 with his/her finger and rather strongly presses the enable switch 65 by reflex.

The portable-side emergency stop switch 66 is a push button switch, for example. The portable-side emergency stop switch 66 is located at a front surface of the portable remote controller 6. The portable-side emergency stop switch 66 is pressed when the stacker crane 12 needs to be stopped emergently while the stacker crane 12 is in the manual operation mode. Once the portable-side emergency stop switch 66 is pressed, the portable-side emergency stop switch 66 is kept in the pressed state even after the operating force is removed therefrom. Rotating or pulling the portable-side emergency stop switch 66 to the right releases the pressed state.

In a state where the portable-side emergency stop switch 66 is pressed, the portable remote controller 6 transmits, to the second receiver 22, an emergency stop signal that is a state signal indicating the emergency stop switch being on. In a state where the portable-side emergency stop switch 66 is not pressed, the portable remote controller 6 transmits, to the second receiver 22, a non-stop signal that is a state signal indicating the emergency stop switch being off.

As shown in FIG. 4, the portable remote controller 6 includes a portable remote controller wireless portion 67 and a portable remote controller safety portion 68. The portable remote controller wireless portion 67 and the portable remote controller safety portion 68, which are connected by a UART for example, perform serial communication.

The portable remote controller wireless portion 67, which is a computer (specifically, a wireless communication module), includes a CPU, a ROM, a RAM, and the like. The portable remote controller wireless portion 67 wirelessly communicates with the second receiver wireless portion 28 included in the second receiver 22.

The portable remote controller safety portion 68, which is a computer, includes a CPU, a ROM, a RAM, and the like. The portable remote controller safety portion 68 provides a function safety portion. The portable remote controller safety portion 68 is electrically connected to the enable switch 65 and the portable-side emergency stop switch 66. The portable remote controller safety portion 68 outputs a state signal indicating states of the enable switch 65 and the portable-side emergency stop switch 66 to the portable remote controller wireless portion 67.

As thus far described, the automated warehouse 1 of this preferred embodiment includes the safety signal system (wireless communication system) 20 separately from a transmission/reception system (the first receiver 21 and the tablet 5) to transmit and receive operation instructions to operate the stacker crane 12. The safety signal system (wireless communication system) 20 transmits and receives an enable signal that enables an operation instruction provided to the stacker crane 12 and an emergency stop signal that is provided in a case of emergency. The safety signal system 20 is defined by the second receiver 22, the stationary remote controller 4, and the portable remote controller 6, as shown in FIG. 4.

The safety signal system 20 allows an emergency stop signal, etc. to be transmitted to the second receiver 22 without delay, and in a case of emergency, is able to promptly stop the operation of the stacker crane 12.

In this preferred embodiment, the safety signal system 20 is constructed by wireless communication. This provides easy handling because there is no risk that the signal cable will be caught on a machine. In addition, the portable remote controller 6, and the like, is able to be lightened by a weight corresponding to the signal cable. Therefore, a burden on the operator is able to be reduced.

Due to the characteristics of wireless communication that do not need any physical coupling between communication devices with a signal cable and thus allow connection partners to be easily changed, it is difficult for the operator to intuitively recognize which communication device is in communication with a certain communication device.

Next, a registration operation of registering a permitted communication partner will be described. This operation is necessary before the safety signal system 20 described above starts working. Although the portable remote controller 6 will be taken as an example in the description of the registration operation, a registration operation for the stationary remote controller 4 is substantially the same.

Registering a permitted communication partner means that each of the stationary remote controller 4, the portable remote controller 6, and the second receiver 22 preliminarily registers identification information on a partner that is permitted to communicate with the stationary remote controller 4 itself, the portable remote controller 6 itself, or the second receiver 22 itself, the registration being performed in a situation that allows the operator to confirm the registration. Two communication devices, by mutually registering partner's identification information, perform wireless communication to implement the safety signal system 20.

The identification information may be in any form, as long as it is able to uniquely identify the portable remote controller 6 and the second receiver 22. In this preferred embodiment, information provided by properly processing a MAC address is the identification information. Hereinafter, this identification information may be referred to as ID. The ID of the portable remote controller 6 may be, for example, operation-side communication device identification information. The ID of the second receiver 22 may be, for example, machine-side communication device identification information.

In this preferred embodiment, though details will be provided later, a registration operation that the portable remote controller 6 performs to register the ID of the second receiver 22 and a registration operation that the second receiver 22 performs to register the ID of the portable remote controller 6 are intentionally separated, and are performed in the portable remote controller 6 and in the second receiver 22 independently of each other. That is, each of the portable remote controller 6 and the second receiver 22 registers the partner that is permitted to communicate therewith by one-way communication. Accordingly, many confirmation opportunities are able to be provided. As a result, a situation where the operator registers an unexpected communication device as a permitted communication partner is able to be avoided with reliability.

An operation that a portable remote controller 6A performs to register the ID of a second receiver 22A as a potential communication partner will be described first. The portable remote controller 6A and the second receiver 22A are uniquely selected by the operator, as mutual communication partners, from among a plurality of portable remote controllers 6 and a plurality of second receivers 22.

The operator boots the tablet 5, and executes a program for the registration operation. The program is an application, for example, a wizard, that is able to set various settings, and is preinstalled in the tablet 5.

In accordance with a guidance that the program displays on the tablet 5, the operator connects the tablet 5 to the second receiver 22A through the USB cable 8, as shown in FIG. 5. Then, the operator boots the second receiver 22A, which is connected by wire to the tablet 5, in the maintenance mode.

The program in the tablet 5 side waits until booting of the second receiver 22A and connection of the second receiver 22A to the tablet 5 are able to be confirmed. Then, the program in the tablet 5 side enters a state where various operations are allowed. Then, the operator operates the tablet 5, to cause the ID of the second receiver 22A to be outputted to the tablet 5. This output is provided through data communication via the USB cable 8. The tablet 5 stores the ID received.

After the tablet 5 receives the ID of the second receiver 22A, the operator removes the USB cable 8 connecting the second receiver 22A to the tablet 5, in accordance with a guidance that the program displays on the tablet 5. Then, the operator connects the USB cable 64 included in the portable remote controller 6A to the tablet 5 as shown in FIG. 7, and boots the portable remote controller 6A in the maintenance mode.

The program in the tablet 5 side waits until booting of the portable remote controller 6A and connection of the portable remote controller 6A to the tablet 5 are able to be confirmed. Then, the program in the tablet 5 side enters a state where various operations are allowed. The operator properly operates the tablet 5, and the ID of the second receiver 22A, which is stored in the tablet 5, is received by the portable remote controller 6A (a machine-side communication device identification information reception step). This reception is performed through data communication via the USB cable 64.

Accordingly, the portable remote controller 6A is able to receive the ID of the second receiver 22A, via the tablet 5. In this process, the operator has to perform the operations of physically connecting the USB cables 8, 64. Accordingly, the operator is able to be provided with a realistic awareness about the correspondence of communication devices between which mutual communication is required to be permitted. Therefore, a situation is able to be avoided where the portable remote controller 6A erroneously receives the ID of an unintended second receiver 22 (that is, a second receiver 22 included in another stacker crane 12), or where an unintended portable remote controller 6 erroneously receives the ID of the second receiver 22A.

After the portable remote controller 6A receives the ID of the second receiver 22A, the program in the tablet 5 side performs a transmitter-side wireless communication test that starts from the portable remote controller 6A. Hereinafter, the transmitter-side wireless communication test will be described with reference to FIG. 9.

First, the operator operates the tablet 5, to instruct that the transmitter-side wireless communication test be started (step S101). This operation is implemented by, for example, the operator tapping an icon of a connection test, etc., which is displayed on the tablet 5. In response to the operation performed by the operator, the tablet 5 outputs a connection test start instruction to the portable remote controller 6A (step S102). The output of this instruction is transmitted through the USB cable 64.

In accordance with the wireless communication test start instruction received from the tablet 5, the portable remote controller 6A wirelessly transmits a test frame (first test signal) to the second receiver 22A (step S103). The test frame includes the ID of the second receiver 22A (hereinafter, sometimes referred to as checking test ID) that was received just now, and the ID of the portable remote controller 6A itself. This step S103 corresponds to a first test signal transmission step.

After receiving the test frame from the portable remote controller 6A, the second receiver 22A checks the checking test ID included in the test frame against the ID of the second receiver 22A itself, and determines whether or not they correspond (step S104, first identification information check step). The second receiver 22A wirelessly transmits a signal, as a reply to the test frame, to the portable remote controller 6A (step S105). The signal includes a check result (first determination result), which is a result of the determination described above, and the ID of the second receiver 22A itself. This step S105 corresponds to a first determination result transmission step.

The portable remote controller 6A determines whether or not the check result included in the signal received from the second receiver 22A indicates that the checking test ID corresponds to the ID of the second receiver 22A (step S106).

If, in step S106, the received check result does not indicate correspondence of the IDs, the portable remote controller 6A outputs, to the tablet 5, information indicating that the test was failed. In response to this, the tablet 5 displays the failure of the test (step S107).

If, in step S106, the received check result indicates correspondence of the IDs, the portable remote controller 6A wirelessly transmits, to the second receiver 22A, a first announcement information output instruction which is an instruction to control the status lamp of the second receiver 22A to light red, for example (step S108). This step S108 corresponds to a first announcement information output instruction transmission step.

In accordance with the first announcement information output instruction received from the portable remote controller 6A, the second receiver 22A controls the status lamp of the second receiver state display portion 23 to light red (step S109). This step S109 corresponds to a first announcement information output step.

Even though the automated warehouse 1 includes a plurality of second receivers 22, only a second receiver 22A that the operator is intending to be a communication partner of the portable remote controller 6A controls its status lamp to light red. Accordingly, by seeing the status lamp, the operator is able to distinctly recognize the second receiver 22A as the permitted communication partner.

The portable remote controller 6A outputs, to the tablet 5, the fact that the received check result has indicated correspondence of the IDs in step S106. In response to this, the tablet 5 displays the success of the test (step S110), and also displays a first operation instruction that requests the operator to perform a predetermined operation (first operation) (step S111). A conceivable way to display the first operation instruction is, for example, displaying a message "Please confirm that the status lamp of the second receiver 22A you want to register as your communication partner is lighting red, and press the confirm button 27." Accordingly, pressing the confirm button 27 corresponds to the first operation.

In accordance with the message displayed on the tablet 5, the operator presses the confirm button 27 of the second receiver 22A (step S112). In response to this, the second receiver 22A wirelessly transmits, to the portable remote controller 6A, a first operation completion signal indicating completion of the operation on the confirm button 27 (step S113). This step S113 corresponds to a first operation completion signal transmission step. Then, the second receiver 22A turns off the status lamp of the second receiver state display portion 23 (step S114).

Upon receiving the first operation completion signal from the second receiver 22A, the portable remote controller 6A determines that the transmitter-side communication test, which was performed as described above, has succeeded, and temporarily registers the received ID of the second receiver 22A as a partner that is permitted to connect therewith (step S115, machine-side communication device identification information registration step). Then, the processing ends (step S116). In step S115, the registration of the ID is just temporary. Final registration of the ID is performed afterward, in step S219 shown in FIG. 10.

Thus, in this preferred embodiment, for the registration of a permitted communication partner, a connection test is performed in accordance with the following processes (1) to (3): (1) the portable remote controller 6A, which is a transmitter, transmits an ID intended to be registered as a potential communication partner to the second receiver 22A, which is a receiver; (2) the second receiver 22A checks whether or not the received ID corresponds to the ID of the second receiver 22A itself, and transmits a result of the check to the portable remote controller 6A; and (3) the portable remote controller 6A confirms the result received from the second receiver 22A. Accordingly, a situation where the ID of an unexpected second receiver 22 is erroneously registered is able to be avoided with reliability.

In addition, the connection test described above is accompanied with lighting a lamp of a communication device intended to be registered as a permitted communication partner and requesting the operator to physically operate the communication device. This provides an opportunity for the operator himself/herself to confirm whether or not the second receiver 22A intended to be registered is in line with the operator's intention. Accordingly, erroneous registration of a permitted communication partner is able to be avoided with enhanced reliability.

Next, a description will be provided to an operation by which the ID of the portable remote controller 6A intended by the operator is registered as a permitted communication partner in the second receiver 22A, which is a receiver. Basically, an operation performed by the operator is similar to the above-described operation except that the portable remote controller 6A and the second receiver 22A are interchanged.

To be specific, in accordance with a guidance that the program displays on the tablet 5, the operator connects the USB cable 64 of the portable remote controller 6A to the tablet 5 as shown in FIG. 7, and boots the portable remote controller 6A in the maintenance mode. Then, the operator properly operates the tablet 5, and the ID of the portable remote controller 6A is outputted to the tablet 5. This output is performed through data communication via the USB cable 64. The tablet 5 stores the received ID.

After the tablet 5 receives the ID of the portable remote controller 6A, the operator removes the USB cable 64 in accordance with a guidance that the program displays on the tablet 5. Then, the operator connects the tablet 5 to the second receiver 22A by the USB cable 8 as shown in FIG. 5, and boots the second receiver 22A in the maintenance mode.

Then, the operator properly operates the tablet 5, and the ID of the portable remote controller 6A, which is stored in the tablet 5, is received by the second receiver 22A (operation-side communication device identification information reception step). This reception is performed through data communication via the USB cable 8.

Accordingly, the second receiver 22A is able to receive the ID of the portable remote controller 6A, via the tablet 5. In this process, the operator has to perform the operations of physically connecting the USB cables 64, 8. Accordingly, the operator is able to be provided with a realistic awareness about the relationship of mutual permission to communicate. Therefore, erroneous registration of a permitted communication partner is able to be avoided.

After the second receiver 22A receives the ID of the portable remote controller 6A, the program in the tablet 5 side performs a receiver-side wireless communication test that starts from the second receiver 22A. Hereinafter, the receiver-side wireless communication test will be described with reference to FIG. 10.

First, the operator operates the tablet 5, to instruct that the receiver-side wireless communication test be started (step S201). This operation is implemented by, for example, the operator tapping an icon of a connection test, etc., which is displayed on the tablet 5. In response to the operation performed by the operator, the tablet 5 outputs a connection test start instruction to the second receiver 22A (step S202). The output of this instruction is transmitted through the USB cable 8.

In accordance with the wireless communication test start instruction received from the tablet 5, the second receiver 22A wirelessly transmits a test frame (second test signal) to the portable remote controller 6A (step S203). The test frame includes the ID of the portable remote controller 6A (hereinafter, sometimes referred to as checking test ID) that was received just now, and the ID of the second receiver 22A itself. This step S203 corresponds to a second test signal transmission step.

After receiving the test frame from the second receiver 22A, the portable remote controller 6A checks the checking test ID included in the test frame against the ID of the portable remote controller 6A itself, and determines whether or not they correspond (step S204, second identification information check step). The portable remote controller 6A wirelessly transmits a signal, as a reply to the test frame, to the second receiver 22A (step S205). The signal includes a check result (second determination result), which is a result of the determination described above, and the ID of the portable remote controller 6A itself. This step S205 corresponds to a second determination result transmission step.

The second receiver 22A determines whether or not the check result included in the signal received from the portable remote controller 6A indicates that the checking test ID corresponds to the ID of the portable remote controller 6A (step S206).

If, in step S206, the received check result does not indicate correspondence of the IDs, the second receiver 22A outputs, to the tablet 5, information indicating that the test was failed. In response to this, the tablet 5 displays the failure of the test (step S207).

If, in step S206, the received check result indicates correspondence of the IDs, the second receiver 22A wirelessly transmits, to the portable remote controller 6A, a second announcement information output instruction which is an instruction to control the status lamp of the portable remote controller 6A to light red, for example (step S208). This step S208 corresponds to a second announcement information output instruction transmission step.

In accordance with the second announcement information output instruction received from the second receiver 22A, the portable remote controller 6A controls the status lamp of the portable remote controller state display portion 60 to light red (step S209). This step S209 corresponds to a second announcement information output step.

Even though the automated warehouse 1 includes a plurality of portable remote controllers 6, only a portable remote controller 6A that the operator is intending to be a communication partner of the second receiver 22A controls its status lamp to light red. Accordingly, by seeing the status lamp, the operator is able to distinctly recognize the portable remote controller 6A as the permitted communication partner.

The second receiver 22A outputs, to the tablet 5, the fact that the received check result has indicated correspondence of the IDs in step S206. In response to this, the tablet 5 displays the success of the test (step S210), and also displays a second operation instruction that requests the operator to perform a predetermined operation (second operation) (step S211). A conceivable way to display the second operation instruction is, for example, displaying a message "Please confirm that the status lamp of the portable remote controller 6A you want to register as your communication partner is lighting red, and press the portable-side emergency stop switch 66." Accordingly, pressing the portable-side emergency stop switch 66 corresponds to the second operation.

In accordance with the message displayed on the tablet 5, the operator presses the portable-side emergency stop switch 66 of the portable remote controller 6A (step S212). In response to this, the portable remote controller 6A wirelessly transmits, to the second receiver 22A, a second operation completion signal indicating completion of the operation on the portable-side emergency stop switch 66 (step S213). This step S213 corresponds to a second operation completion signal transmission step. Then, the portable remote controller 6A turns off the status lamp of the portable remote controller state display portion 60 (step S214).

Upon receiving the second operation completion signal from the portable remote controller 6A, the second receiver 22A determines that the receiver-side communication test, which was performed as described above, has succeeded, and temporarily registers the received ID of the portable remote controller 6A as a permitted communication partner (step S215, operation-side communication device identification information registration step). Then, the second receiver 22A transmits, to the portable remote controller 6A, an end notification indicating that a series of wireless test communication has ended (step S216). Then, the second receiver 22A finalizes registration of the ID that has been temporarily registered in step S215 (step S217). Then, the processing ends (step S218). Upon receiving the end notification transmitted from the second receiver 22A in step S216, the portable remote controller 6A finalizes registration of the ID that has been temporarily registered in step S115 (step S219).

In this preferred embodiment, as thus far described, the operation in which the portable remote controller 6A registers the ID of a partner that is permitted to communicate therewith and the operation in which the second receiver 22A registers the ID of a partner that is permitted to communicate therewith are not integrated in one wireless communication test. That is, each of the portable remote controller 6A and the second receiver 22A registers the ID of a permitted communication partner while performing a wireless communication test individually. Thus, the operator provides opportunities for confirmation in substantially two ways to increase the accuracy in registering a permitted communication partner. Accordingly, a situation where the operator communicates with an unintended communication device is able to be reliably avoided.

In this preferred embodiment, one portable remote controller 6 is allowed to register two or more second receivers 22 as permitted communication partners. Accordingly, the operator operating the one portable remote controller 6 is able to provide instructions while switching from one to another among the second receivers 22 that are registered as the communication partners. Accordingly, the versatility of the portable remote controller 6 is able to be increased.

More specifically, the operator operates the tablet 5 that is mounted to the portable remote controller 6 as shown in FIG. 7, and selects one second receiver 22 as a connection partner from among permitted communication partners that are pre-registered in relation to the portable remote controller 6. As a result, the second receiver 22 defining and functioning as a connection partner of the portable remote controller 6 (and thus, the crane controller 2 of the stacker crane 12 defining and functioning as an operation object) is finalized. A state where one second receiver 22 is finalized to be a connection partner of one portable remote controller 6 is able to be considered as a state where one-to-one pairing is performed, and thus may be referred to as a pairing state. Therefore, the permitted communication partners described above may be considered as potential partners (candidates for pairing) with which the pairing state is created.

One second receiver 22 is allowed to register two or more portable remote controllers 6 or two or more stationary remote controllers 4 as permitted communication partners. Accordingly, the operator operates any of the portable remote controllers 6 or any of the stationary remote controllers 4 that is communicating with the second receiver 22, and thus is able to provide instructions, for example, an instruction to stop the corresponding stacker crane 12.

One stationary remote controller 4 is allowed to register only one second receiver 22 as a permitted communication partner. Considering that the stationary remote controller 4 is fixedly installed unlike the portable remote controller 6, the stationary remote controller 4 is not allowed to change its pairing partner, the second receiver 22. Thus, the operation is simplified.

In order that the portable remote controller 6 or the second receiver 22 is able to register two or more permitted communication partners, the above-described registration operation is repeated with different communication devices as partners.

Accordingly, communication devices that are permitted to communicate each other are allowed to check the partners' IDs mutually, and moreover, by performing the wireless communication tests, are able to prepare a state where both of the communication devices are able to establish wireless communication.

As described above, the portable remote controller 6 (stationary remote controller 4) and the second receiver 22 mutually register each other as partners that are permitted to wirelessly communicate with each other. After that, each of the portable remote controller 6 (stationary remote controller 4) and the second receiver 22 is switched to the normal mode, and pairing is performed between the portable remote controller 6 (stationary remote controller 4) and the second receiver 22, to start wireless communication.

Although a preferred embodiment of the present invention has been described above, the features and operations described above may be modified, for example, as follows.

Figure 9:
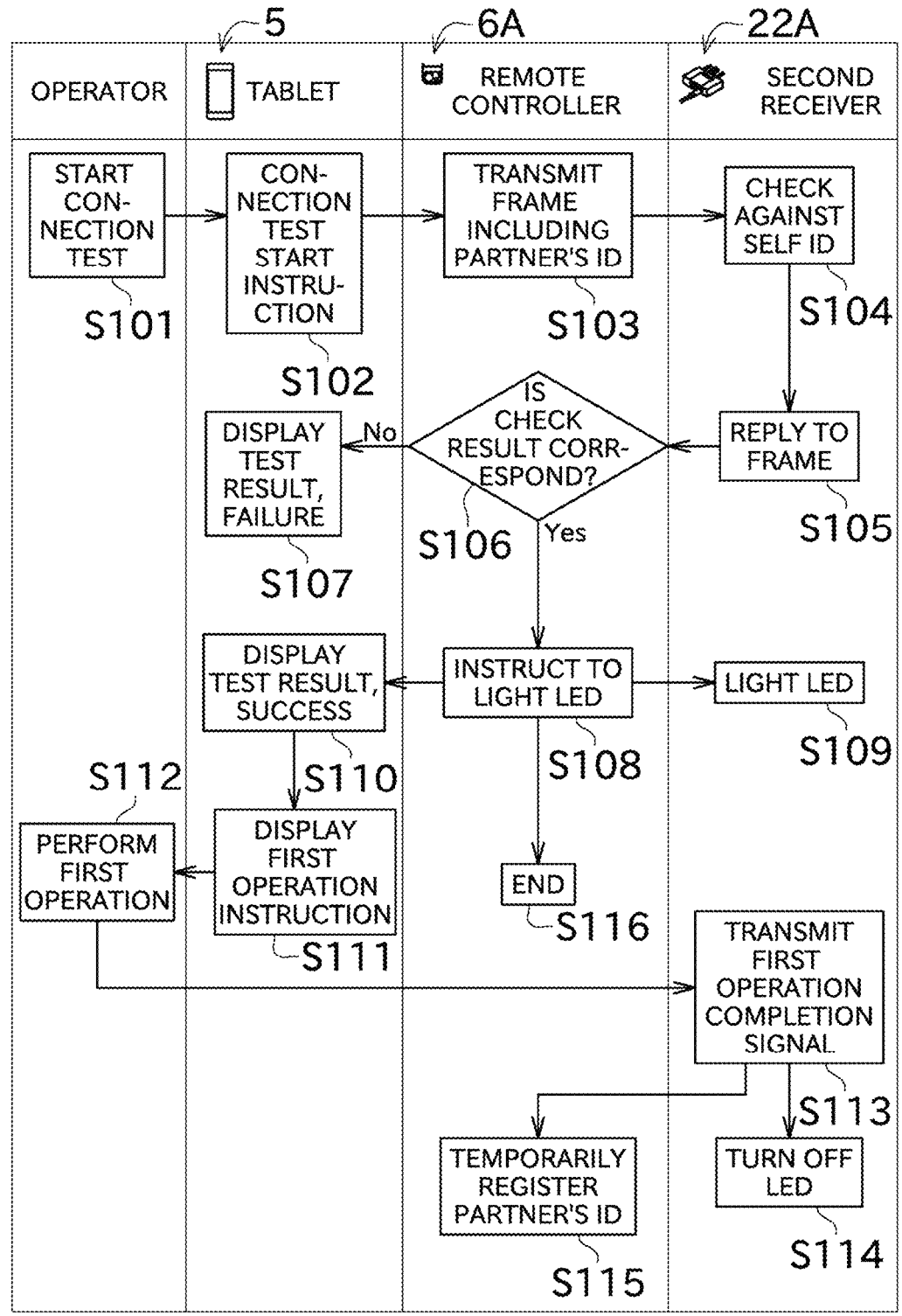
FIG. 9 is a flowchart showing a transmitter-side wireless communication test starting from the portable remote controller.
Figure 10:
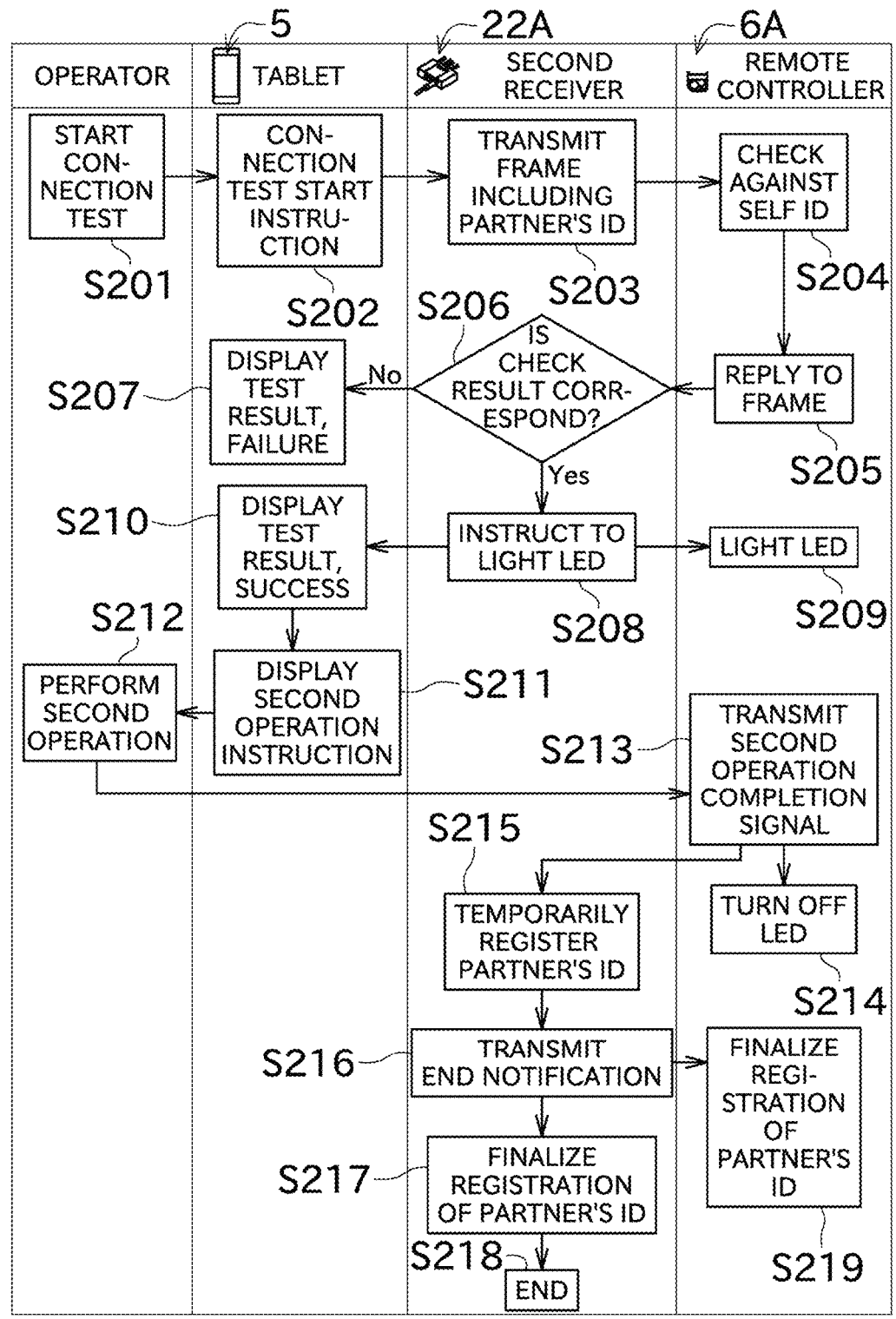
FIG. 10 is a flowchart showing a receiver-side wireless communication test starting from the second receiver.

Before the connection tests shown in FIG. 9 and FIG. 10, the portable remote controller 6 and the second receiver 22 may be directly connected not via the tablet 5 but via a cable to exchange their IDs. These features are able to simplify the operation of reconnecting the cable.

One portable remote controller 6 may include a plurality of (for example, two) enable switches 65.

Either the portable remote controller 6A or the second receiver 22A may be first to perform the registration operation of registering a permitted communication partner.

The output of the first announcement information and the second announcement information may be implemented by lighting the lamp with a color other than red, or by blinking the lamp instead of lighting. Alternatively, the output of the first announcement information and the second announcement information may be implemented by outputting to a display or a speaker, instead of the lamp. In a case of displaying on a display, each of the second receiver 22 and the portable remote controller 6 (stationary remote controller 4) may be provided with a display, or may be connected to an external display.

Instead of the USB cables 64, 8, wired cables according to other specifications may be included for data communication, for example, input/output of IDs.

The ID of a partner that is permitted to connect is inputted from a communication device defining and functioning as the partner to the tablet 5 via the USB cables 64, 8. Instead, it may be acceptable that the operator directly inputs the ID to the tablet 5, for example.

The safety signal system 20 is applicable to industrial machines other than the stacker crane 12.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A permitted communication partner registration method by which an operation-side communication device that is operated by an operator and a machine-side communication device that is connected to an industrial machine mutually register each other as partners that are permitted to communicate with each other, the method comprising:
  a machine-side communication device identification information reception step in which machine-side communication device identification information that identifies the machine-side communication device is received by the operation-side communication device;
  a first test signal transmission step in which the operation-side communication device wirelessly transmits a first test signal to the machine-side communication device, the first test signal including the received machine-side communication device identification information;
  a first identification information check step in which the machine-side communication device determines whether or not the machine-side communication device identification information included in the received first test signal corresponds to identification information on the machine-side communication device itself;
  a machine-side communication device identification information registration step in which, if the machine-side communication device determines that the machine-side communication device identification information included in the first test signal corresponds to the identification information on the machine-side communication device itself in the first identification information check step, the operation-side communication device registers the received machine-side communication device identification information as identification information on a permitted communication partner;
  an operation-side communication device identification information reception step in which operation-side communication device identification information that identifies the operation-side communication device is received by the machine-side communication device;
  a second test signal transmission step in which the machine-side communication device wirelessly transmits a second test signal to the operation-side communication device, the second test signal including the received operation-side communication device identification information;
  a second identification information check step in which the operation-side communication device determines whether or not the operation-side communication device identification information included in the received second test signal corresponds to identification information on the operation-side communication device itself;
  an operation-side communication device identification information registration step in which, if the operation-side communication device determines that the operation-side communication device identification information included in the second test signal corresponds to the identification information on the operation-side communication device itself in the second identification information check step, the machine-side communication device registers the received operation-side communication device identification information as identification information on a permitted communication partner;
  a first announcement information output step in which, if the machine-side communication device determines that the received machine-side communication device identification information corresponds to the identification information on the machine-side communication device itself in the first identification information check step, a first announcement information is outputted to attract attention to the machine-side communication device;

a first operation completion signal transmission step in which, if a first operation corresponding to the first announcement information is performed, the machine-side communication device wirelessly transmits a first operation completion signal to the operation-side communication device, the first operation completion signal indicating completion of the first operation;

a second announcement information output step in which, if the operation-side communication device determines that the received operation-side communication device identification information corresponds to the identification information on the operation-side communication device itself in the second identification information check step, a second announcement information is outputted to attract attention to the operation-side communication device; and a second operation completion signal transmission step in which, if a second operation corresponding to the second announcement information is performed, the operation-side communication device wirelessly transmits a second operation completion signal to the machine-side communication device, the second operation completion signal indicating completion of the second operation, wherein the machine-side communication device identification information registration step is performed after the operation-side communication device receives the first operation completion signal; and the operation-side communication device identification information registration step is performed after the machine-side communication device receives the second operation completion signal.

2. The permitted communication partner registration method according to claim 1, wherein the output of the first announcement information is implemented by lighting a lamp included in the machine-side communication device; and the output of the second announcement information is implemented by lighting a lamp included in the operation-side communication device.

3. The permitted communication partner registration method according to claim 1, further comprising:

a first determination result transmission step in which the machine-side communication device transmits a first determination result to the operation-side communication device, the first determination result being a result of determination performed in the first identification information check step;

a first announcement information output instruction transmission step in which, if the first determination result received by the operation-side communication device indicates that the machine-side communication device identification information included in the first test signal corresponds to the identification information on the machine-side communication device itself, a first announcement information output instruction to control the first announcement information to be outputted is transmitted to the machine-side communication device;

a second determination result transmission step in which the operation-side communication device transmits a second determination result to the machine-side communication device, the second determination result being a result of determination performed in the second identification information check step; and a second announcement information output instruction transmission step in which, if the second determination result received by the machine-side communication device indicates that the operation-side communication device identification information included in the second test signal corresponds to the identification information on the operation-side communication device itself, a second announcement information output instruction to control the second announcement information to be outputted is transmitted to the operation-side communication device.

4. The permitted communication partner registration method according to claim 1, wherein the method is implemented in a system including a plurality of the operation-side communication devices, a plurality of the industrial machines, and a plurality of the machine-side communication devices each connected to each of the industrial machines in one-to-one correspondence.

5. The permitted communication partner registration method according to claim 1, wherein in the machine-side communication device identification information reception step, the machine-side communication device identification information is received by the operation-side communication device via a wired cable; and in the operation-side communication device identification information reception step, the operation-side communication device identification information is received by the machine-side communication device via a wired cable.

6. The permitted communication partner registration method according to claim 1, wherein the operation-side communication device is a remote controller that is connectable to a portable terminal via a wired cable, the portable terminal being able to perform wireless communication; and the portable terminal wirelessly transmits an instruction to control an operation of the industrial machine.

7. The permitted communication partner registration method according to claim 6, wherein the portable terminal receives the machine-side communication device identification information on the machine-side communication device from the machine-side communication device via a wired cable, and outputs the received machine-side communication device identification information to the operation-side communication device via a wired cable; and the portable terminal receives the operation-side communication device identification information on the operation-side communication device from the operation-side communication device via a wired cable, and outputs the received operation-side communication device identification information to the machine-side communication device via a wired cable.

8. The permitted communication partner registration method according to claim 1, wherein the machine-side communication device identification information registration step is performed while the operation-side communication device is in a maintenance mode different from a normal mode performed when the industrial machine is operated; and the operation-side communication device identification information registration step is performed while the machine-side communication device is in a maintenance mode different from a normal mode performed when the industrial machine is operated.

9. A wireless communication system comprising:
an operation-side communication device that is operated by an operator; and
a machine-side communication device that is connected to an industrial machine, wherein
to mutually register the operation-side communication device and the machine-side communication device as partners that are permitted to communicate each other,
the operation-side communication device receives machine-side communication device identification information that identifies the machine-side communication device, and then wirelessly transmits a first test signal to the machine-side communication device, the first test signal including the received machine-side communication device identification information;
the machine-side communication device determines whether or not the machine-side communication device identification information included in the received first test signal corresponds to identification information on the machine-side communication device itself;
if the machine-side communication device determines that the machine-side communication device identification information included in the first test signal corresponds to the identification information on the machine-side communication device itself, the operation-side communication device registers the received machine-side communication device identification information as identification information on a permitted communication partner;
the machine-side communication device receives operation-side communication device identification information that identifies the operation-side communication device, and then wirelessly transmits a second test signal to the operation-side communication device, the second test signal including the received operation-side communication device identification information;
the operation-side communication device determines whether or not the operation-side communication device identification information included in the received second test signal corresponds to identification information on the operation-side communication device itself;
if the operation-side communication device determines that the operation-side communication device identification information included in the second test signal corresponds to the identification information on the operation-side communication device itself, the machine-side communication device registers the received operation-side communication device identification information as identification information on a permitted communication partner;
if the machine-side communication device determines that the received machine-side communication device identification information corresponds to the identification information on the machine-side communication device itself, a first announcement information is outputted to attract attention to the machine-side communication device;
if a first operation corresponding to the first announcement information is performed, the machine-side communication device wirelessly transmits a first operation completion signal to the operation-side communication device, the first operation completion signal indicating completion of the first operation;
if the operation-side communication device determines that the received operation-side communication device identification information corresponds to the identification information on the operation-side communication device itself, a second announcement information is outputted to attract attention to the operation-side communication device;
if a second operation corresponding to the second announcement information is performed, the operation-side communication device wirelessly transmits a second operation completion signal to the machine-side communication device, the second operation completion signal indicating completion of the second operation;
the received machine-side communication device identification information is registered as the identification information on the permitted communication partner after the operation-side communication device receives the first operation completion signal; and
the received operation-side communication device identification information is registered as the identification information on the permitted communication partner after the machine-side communication device receives the second operation completion signal.

* * * * *